(12) United States Patent
Greenbaum

(10) Patent No.: US 9,171,314 B2
(45) Date of Patent: Oct. 27, 2015

(54) CLOUD BASED MANAGEMENT OF AN IN-STORE DEVICE EXPERIENCE

(75) Inventor: Gary Scott Greenbaum, Mercer Island, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 628 days.

(21) Appl. No.: 13/162,347

(22) Filed: Jun. 16, 2011

(65) Prior Publication Data

US 2012/0324440 A1 Dec. 20, 2012

(51) Int. Cl.
| | |
|---|---|
| G06F 9/44 | (2006.01) |
| G06F 9/445 | (2006.01) |
| G06F 15/16 | (2006.01) |
| G06F 15/177 | (2006.01) |
| G06Q 30/02 | (2012.01) |
| G06F 11/30 | (2006.01) |
| G06F 11/34 | (2006.01) |

(52) U.S. Cl.
CPC ............ *G06Q 30/02* (2013.01); *G06F 11/3051* (2013.01); *G06F 11/3438* (2013.01); *G06F 11/3495* (2013.01); *G06F 2201/875* (2013.01)

(58) Field of Classification Search
CPC ...... G06F 8/60–8/61; G06F 8/63; G06F 8/65; G06F 8/67–8/68
See application file for complete search history.

(56) References Cited

U.S. PATENT DOCUMENTS

| | | | | |
|---|---|---|---|---|
| 6,049,671 | A * | 4/2000 | Slivka et al. | 717/173 |
| 6,496,979 | B1 * | 12/2002 | Chen et al. | 717/178 |
| 6,604,238 | B1 * | 8/2003 | Lim et al. | 717/177 |
| 6,702,488 | B1 * | 3/2004 | Hooper et al. | 400/61 |
| 6,918,113 | B2 * | 7/2005 | Patel et al. | 717/178 |
| 7,251,812 | B1 * | 7/2007 | Jhanwar et al. | 717/171 |
| 7,266,818 | B2 * | 9/2007 | Pike et al. | 717/176 |
| 7,275,243 | B2 * | 9/2007 | Gibbons et al. | 717/159 |
| 7,363,623 | B2 * | 4/2008 | Kishida | 717/174 |
| 7,434,217 | B2 * | 10/2008 | Morris | 717/177 |
| 7,596,610 | B2 * | 9/2009 | Faisal et al. | 709/220 |
| 7,676,802 | B2 * | 3/2010 | Mittal | 717/168 |
| 7,831,321 | B2 * | 11/2010 | Ebrom et al. | 700/87 |

(Continued)

OTHER PUBLICATIONS

Juniper Networks—Solution Brief, "Deploy and Provision Granular Role- and Device-Based Security Policies for Smart Phone and Mobile Device Access to Enterprise Applications and Data", 3510359-EN Feb. 2010; Retrieved Mar. 15, 2011, 4 pages, http://www.juniper.net/us/en/local/pdf/solutionbriefs/3510359-en.pdf.

(Continued)

*Primary Examiner* — Tuan Q. Dam
*Assistant Examiner* — Zheng Wei
(74) *Attorney, Agent, or Firm* — Brian Haslam; Mike Allean; Micky Minhas

(57) ABSTRACT

The technology allows a user's demo experience to be set up and maintained remotely. Retailers and vendors may remotely manage and update the user experience on demonstration devices. A package of applications that highlight a particular device's capabilities can be selected and installed on demo versions of the particular device in stores all across the country. Usage information from the demonstration devices may be collected. With the collected information, retailers can ascertain user interest in particular devices and applications. Further, the user experience may be maintained and reset to default settings on a regular basis. Automatically resetting the experience maintains a consistent retail experience.

20 Claims, 10 Drawing Sheets

(56) References Cited

U.S. PATENT DOCUMENTS

| | | | |
|---|---|---|---|
| 7,881,745 B1 | 2/2011 | Rao et al. | |
| 8,019,835 B2* | 9/2011 | Suorsa et al. | 709/220 |
| 8,146,072 B2* | 3/2012 | Trueba | 717/170 |
| 8,239,852 B2* | 8/2012 | Etchegoyen | 717/172 |
| 8,239,857 B2* | 8/2012 | Osada | 717/177 |
| 8,346,223 B1* | 1/2013 | Byrnes et al. | 455/414.1 |
| 8,407,682 B2* | 3/2013 | Reisman | 717/168 |
| 8,752,044 B2* | 6/2014 | Motta et al. | 717/178 |
| 8,826,260 B2* | 9/2014 | Ran et al. | 717/168 |
| 8,990,360 B2* | 3/2015 | Lang et al. | 709/220 |
| 2002/0157089 A1* | 10/2002 | Patel et al. | 717/178 |
| 2002/0174264 A1* | 11/2002 | Fuller et al. | 709/321 |
| 2004/0093595 A1* | 5/2004 | Bilange | 717/171 |
| 2005/0108707 A1* | 5/2005 | Taylor et al. | 717/177 |
| 2005/0289535 A1* | 12/2005 | Murray et al. | 717/172 |
| 2006/0026589 A1* | 2/2006 | Schneider et al. | 717/174 |
| 2006/0031832 A1* | 2/2006 | Kishida | 717/176 |
| 2006/0080659 A1* | 4/2006 | Ganji | 717/178 |
| 2007/0118560 A1* | 5/2007 | Bornhoevd et al. | 707/104.1 |
| 2007/0169084 A1* | 7/2007 | Frank et al. | 717/168 |
| 2008/0028395 A1* | 1/2008 | Motta et al. | 717/177 |
| 2008/0125912 A1* | 5/2008 | Heilman et al. | 700/275 |
| 2008/0134162 A1* | 6/2008 | James et al. | 717/168 |
| 2008/0134165 A1* | 6/2008 | Anderson et al. | 717/173 |
| 2008/0141244 A1* | 6/2008 | Kelley | 717/178 |
| 2008/0222630 A1* | 9/2008 | Taylor et al. | 717/176 |
| 2008/0242406 A1* | 10/2008 | Irving et al. | 463/29 |
| 2008/0244566 A1* | 10/2008 | Fukaya | 717/176 |
| 2008/0263532 A1* | 10/2008 | Yang et al. | 717/168 |
| 2008/0263543 A1* | 10/2008 | Ramachandran | 717/177 |
| 2009/0158272 A1* | 6/2009 | El-Assir et al. | 717/177 |
| 2009/0222483 A1* | 9/2009 | Johnson et al. | 707/104.1 |
| 2009/0222813 A1* | 9/2009 | Johnson et al. | 717/174 |
| 2009/0222826 A1* | 9/2009 | Johnson et al. | 718/102 |
| 2010/0058321 A1* | 3/2010 | Anderson et al. | 717/173 |
| 2010/0076871 A1* | 3/2010 | Lloyd et al. | 705/27 |
| 2010/0107124 A1* | 4/2010 | Herbruck | 715/835 |
| 2010/0153482 A1 | 6/2010 | Kim et al. | |
| 2010/0251231 A1* | 9/2010 | Coussemaeker et al. | 717/176 |
| 2010/0262619 A1 | 10/2010 | Zargahi et al. | |
| 2010/0333081 A1* | 12/2010 | Etchegoyen | 717/172 |
| 2011/0010705 A1* | 1/2011 | Adams et al. | 717/178 |
| 2011/0067023 A1* | 3/2011 | Chiyo et al. | 717/177 |
| 2011/0145812 A1* | 6/2011 | Kong et al. | 717/178 |
| 2012/0036049 A1* | 2/2012 | Gerzymisch et al. | 705/29 |
| 2012/0110563 A1* | 5/2012 | Ran et al. | 717/170 |
| 2012/0137282 A1* | 5/2012 | Illowsky et al. | 717/177 |
| 2012/0204171 A1* | 8/2012 | Reisman | 717/172 |
| 2012/0291023 A1* | 11/2012 | Lu et al. | 717/178 |
| 2012/0311675 A1* | 12/2012 | Ham et al. | 726/4 |
| 2013/0247029 A1* | 9/2013 | Scardino | 717/177 |
| 2013/0339941 A1* | 12/2013 | Shelton | 717/172 |

OTHER PUBLICATIONS

CISCO.com "Cisco Virtual Network Management Center GUI Configuration Guide", Release 1.0.1, Retrieved Mar. 16, 2011, 3 pages, http://www.cisco.com/en/US/docs/unified_computing/vnmc/sw/1.0.1/VNMC_GUI_Configuration_Guide/VNMC_GUI_Configuration_Guide_chapter1.html.

McAfee, "Ensuring Persistent Policy Compliance" Technical Brief, Retrieved Mar. 15, 2011, 2 pages, http://www.mcafee.com/us/resources/solution-briefs/sb-ensuring-persistent-policy-compliance.pdf.

Intel "Intel® Expressway Cloud Access 360" Product Brief, Retrieved Mar. 15, 2011; 8 pages; http://www.cloudconnectevent.com/downloads/Intel_CloudAccess360_ProductSuite_Brief.pdf.

Bridgewater Systems, "Over-the-Air Provisioning for WiMAX Operators" White Paper, Retrieved Mar. 15, 2011, 7 pages, http://www.wimaxforum.org/sites/wimaxforum.org/files/document_library/bridgewater%20over-the-air%20provisioning%20whitepaper%200409.pdf.

Nokia, "Nokia Intellisync Device Management", Retrieved Mar. 15, 2011, 2 pages, http://www.nokia.ru/NOKIA_BUSINESS_26/Europe/Products/Mobile_Software/sidebars/pdfs/DeviceMgt_Datasheet_EMEA.pdf.

* cited by examiner

RETAIL STORE 1
DISPLAY DEVICES

300

| | |
|---|---|
| BRAND X PC HARDWARE CONFIG 1<br>OPERATING SYSTEM 1 | ~310 |
| BRAND X PC HARDWARE CONFIG 2<br>OPERATING SYSTEM 1 | ~312 |
| BRAND X PC HARDWARE CONFIG 3<br>OPERATING SYSTEM 1 | ~314 |
| BRAND X PC HARDWARE CONFIG 4<br>OPERATING SYSTEM 2 | ~316 |
| BRAND Y PC HARDWARE CONFIG 5<br>OPERATING SYSTEM 1 | ~318 |
| BRAND Y PC HARDWARE CONFIG 6<br>OPERATING SYSTEM 1 | ~320 |
| BRAND Y PC HARDWARE CONFIG 7<br>OPERATING SYSTEM 3 | ~322 |
| BRAND A MOBILE DEVICE HARDWARE CONFIG 8<br>OPERATING SYSTEM 4 | ~324 |
| BRAND A MOBILE DEVICE HARDWARE CONFIG 9<br>OPERATING SYSTEM 5 | ~326 |
| BRAND B MOBILE DEVICE HARDWARE CONFIG 10<br>OPERATING SYSTEM 6 | ~328 |
| BRAND X TABLET HARDWARE CONFIG 11<br>OPERATING SYSTEM 1 | ~330 |
| BRAND Y TABLET HARDWARE CONFIG 12<br>OPERATING SYSTEM 2 | ~332 |
| BRAND C NAVIGATION DEVICE HARDWARE CONFIG 13<br>OPERATING SYSTEM 7 | ~334 |
| BRAND D NAVIGATION DEVICE HARDWARE CONFIG 14<br>OPERATING SYSTEM 8 | ~336 |
| BRAND X ALL-IN-ONE HARDWARE CONFIG 15<br>OPERATING SYSTEM 1 | ~338 |
| BRAND E GAME CONSOLE HARDWARE CONFIG 16<br>OPERATING SYSTEM 9 | ~340 |
| BRAND F TV HARDWARE CONFIG 17<br>OPERATING SYSTEM 10 | ~342 |

*FIG. 3.*

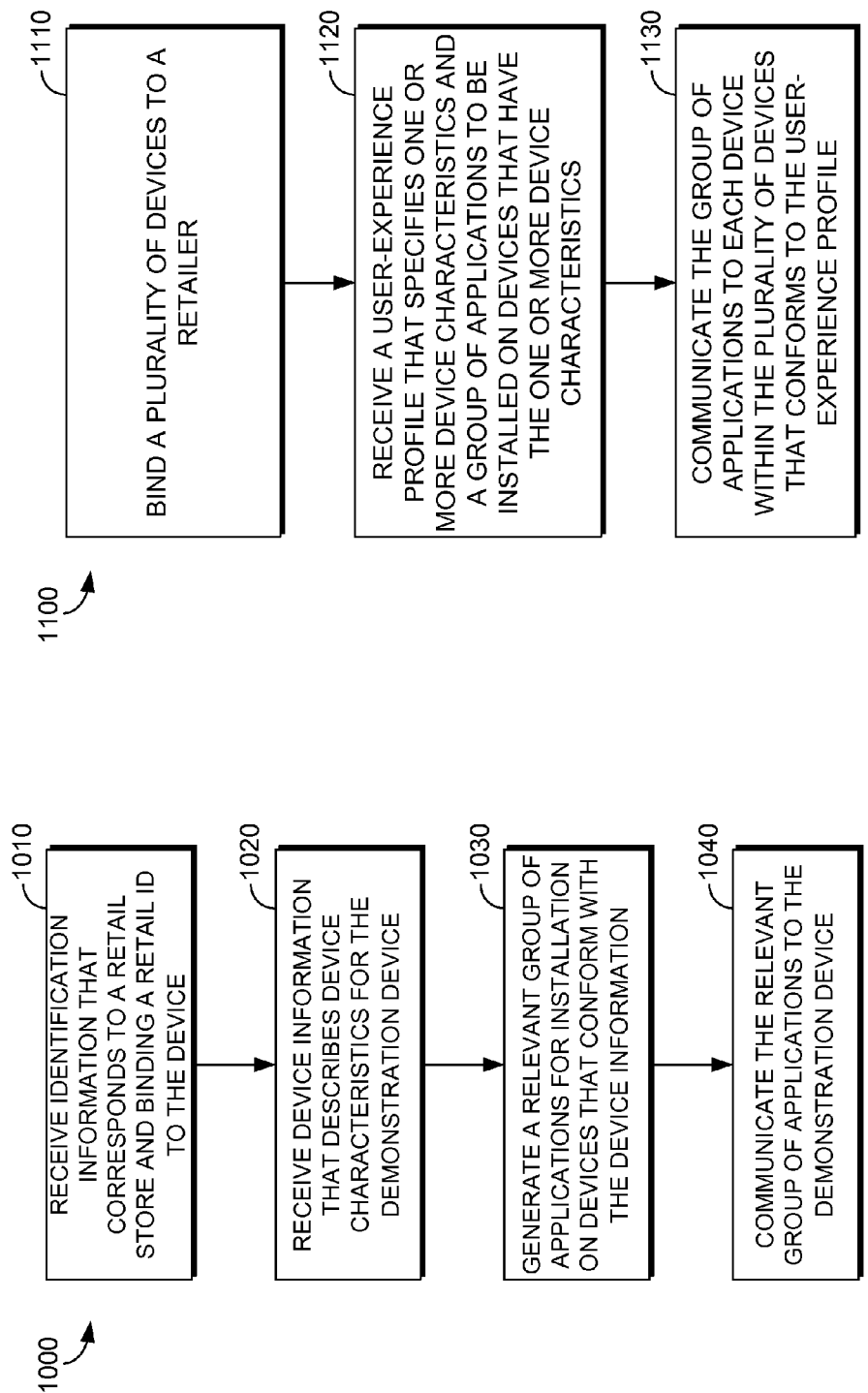

CLOUD BASED MANAGEMENT OF AN IN-STORE DEVICE EXPERIENCE

BACKGROUND

Retail stores let consumers inspect and interact with products set up in their stores. Computing devices such as personal computers, laptops, tablets, smart phones, e-readers, and other similar devices require store employees to first set up and install demonstration software on these devices to enable a user to demo the product. A store clerk may use a USB thumb drive to load demonstration software provided by a vendor, a brand manager, and/or a particular store.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Embodiments of the present invention allow a user's demo experience to be set up and maintained remotely. Demonstration devices are communicatively coupled to a remote experience manager that allows retailers and vendors to remotely manage and update the user experience on demonstration devices. The remote experience manager allows a user's experience to be consistent across stores and products. Remotely controlling the user experience on devices across a wide range of stores allows individual user experiences on particular devices to be customized and optimized. A package of applications that highlight a particular device's capabilities can be selected and installed on demo versions of the particular device in stores all across the country. In one aspect, an application accessed through the demonstration device allows the user experience to be updated locally by adding, removing, and updating applications. Similarly, an interface on the demonstration device may allow settings to be reset to optimum values.

Embodiments of the present invention also allow retailers and vendors to collect usage information from the demonstration devices. With the collected information, retailers can ascertain user interest in particular devices and applications on these devices that appeal to the users. Popular applications can be installed on other devices based on this information. Similarly, seldom used applications could be eliminated altogether or replaced with a more appealing application that better highlights a particular devices capabilities. Further, the user experience may be maintained and reset to default settings on a regular basis. As users interact with a demonstration device, the settings can change in ways that make subsequent user experiences with the computing device less appealing. Automatically resetting the experience maintains a consistent retail experience.

BRIEF DESCRIPTION OF THE DRAWINGS

Embodiments of the invention are described in detail below with reference to the attached drawing figures, wherein:

FIG. 3 is a table showing characteristics of devices within a store, in accordance with an embodiment of the present invention;

FIG. 10 is a flow diagram illustrating a method of remotely managing applications on a consumer device that enhance a consumer's retail experience, in accordance with an embodiment of the present invention;

FIG. 11 is a flow diagram illustrating a method of remotely managing a consumer experience in a retail store, in accordance with an embodiment of the present invention.

DETAILED DESCRIPTION

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention allow a user's demo experience to be set up and maintained remotely (i.e. from the "cloud") Demonstration devices are communicatively coupled to a remote experience manager that allows retailers and vendors to remotely manage and update the user experience on demonstration devices. The remote experience manager allows a user's experience to be consistent across stores and products. Remotely controlling the user experience on devices across a wide range of stores allows individual user experiences on particular devices to be customized and optimized. A package of applications that highlight a particular device's capabilities can be selected and installed on demo versions of the particular device in stores all across the country. In one aspect, an application accessed through the demonstration device allows the user experience to be updated locally by adding, removing, and updating applications. Similarly, an interface on the demonstration device may allow settings to be reset to optimum values.

Embodiments of the present invention also allow retailers and vendors to collect usage information from the demonstration devices. With the collected information, retailers can ascertain user interest in particular devices and applications on these devices that appeal to the users. Popular applications can be installed on other devices based on this information. Similarly, seldom used applications could be eliminated altogether or replaced with a more appealing application that better highlights a particular devices capabilities. Further, the user experience may be maintained and reset to default settings on a regular basis. As users interact with a demonstration device, the settings can change in ways that make subsequent user experiences with the computing device less appealing. Automatically resetting the experience maintains a consistent retail experience.

Having briefly described an overview of embodiments of the invention, an exemplary operating environment suitable for use in implementing embodiments of the invention is described below.

Exemplary Operating Environment

Figure 1:
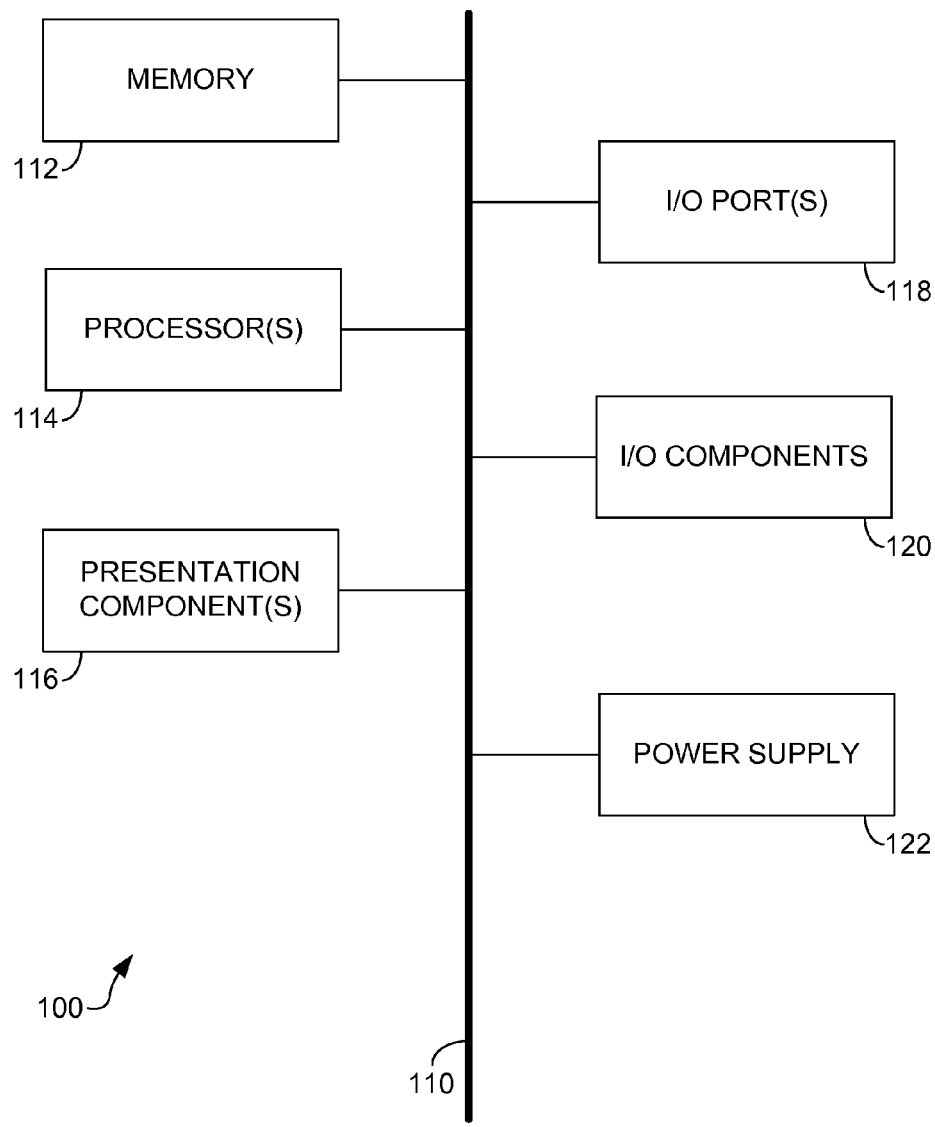
FIG. 1 is a block diagram of an exemplary computing environment suitable for implementing embodiments of the invention.

Referring to the drawings in general, and initially to FIG. 1 in particular, an exemplary operating environment for implementing embodiments of the invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program components, being executed by a computer or other machine, such as a server. Generally, program components including routines, programs, objects, components, data structures, and the like, refer to code that performs particular tasks, or implements particular abstract data types. Embodiments of the invention may be practiced in a variety of system configurations, including general-purpose computers, specialty computing devices, etc. Embodiments of the invention may also be practiced in distributed computing environments where tasks are performed by remote-processing devices that are linked through a communications network.

With continued reference to FIG. 1, computing device 100 includes a bus 110 that directly or indirectly couples the following devices: memory 112, one or more processors 114, one or more presentation components 116, input/output (I/O) ports 118, I/O components 120, and an illustrative power supply 122. Bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component 120t. Also, processors have memory. The inventors hereof recognize that such is the nature of the art, and reiterate that the diagram of FIG. 1 is merely illustrative of an exemplary computing device that can be used in connection with one or more embodiments of the invention. Distinction is not made between such categories as "workstation," "server," "laptop," "handheld device," etc., as all are contemplated within the scope of FIG. 1 and reference to "computer" or "computing device."

Computing device 100 typically includes a variety of computer-readable storage media. By way of example, computer-storage media may comprise Random Access Memory (RAM); Read Only Memory (ROM); Electronically Erasable Programmable Read Only Memory (EEPROM); flash memory or other memory technologies; Compact Disk Read-Only Memory (CDROM), digital versatile disks (DVDs) or other optical or holographic media; magnetic cassettes, magnetic tape, magnetic disk storage or other magnetic storage devices; or any other medium that can be used to encode desired information and be accessed by computing device 100. The computer-readable storage media may be non-transitory.

Memory 112 includes computer-storage media in the form of volatile and/or nonvolatile memory. The memory 112 may be removable, non-removable, or a combination thereof. Exemplary memory includes solid-state memory, hard drives, optical-disc drives, etc. Computing device 100 includes one or more processors 114 that read data from various entities such as bus 110, memory 112, or I/O components 120. Presentation component(s) 116 present data indications to a user or other device. Exemplary presentation components 116 include a display device, speaker, printing component, vibrating component, etc. I/O ports 118 allow computing device 100 to be logically coupled to other devices including I/O components 120, some of which may be built in. Illustrative I/O components 120 include a microphone, satellite dish, scanner, printer, wireless device, etc.

Exemplary System Architecture

Figure 2:
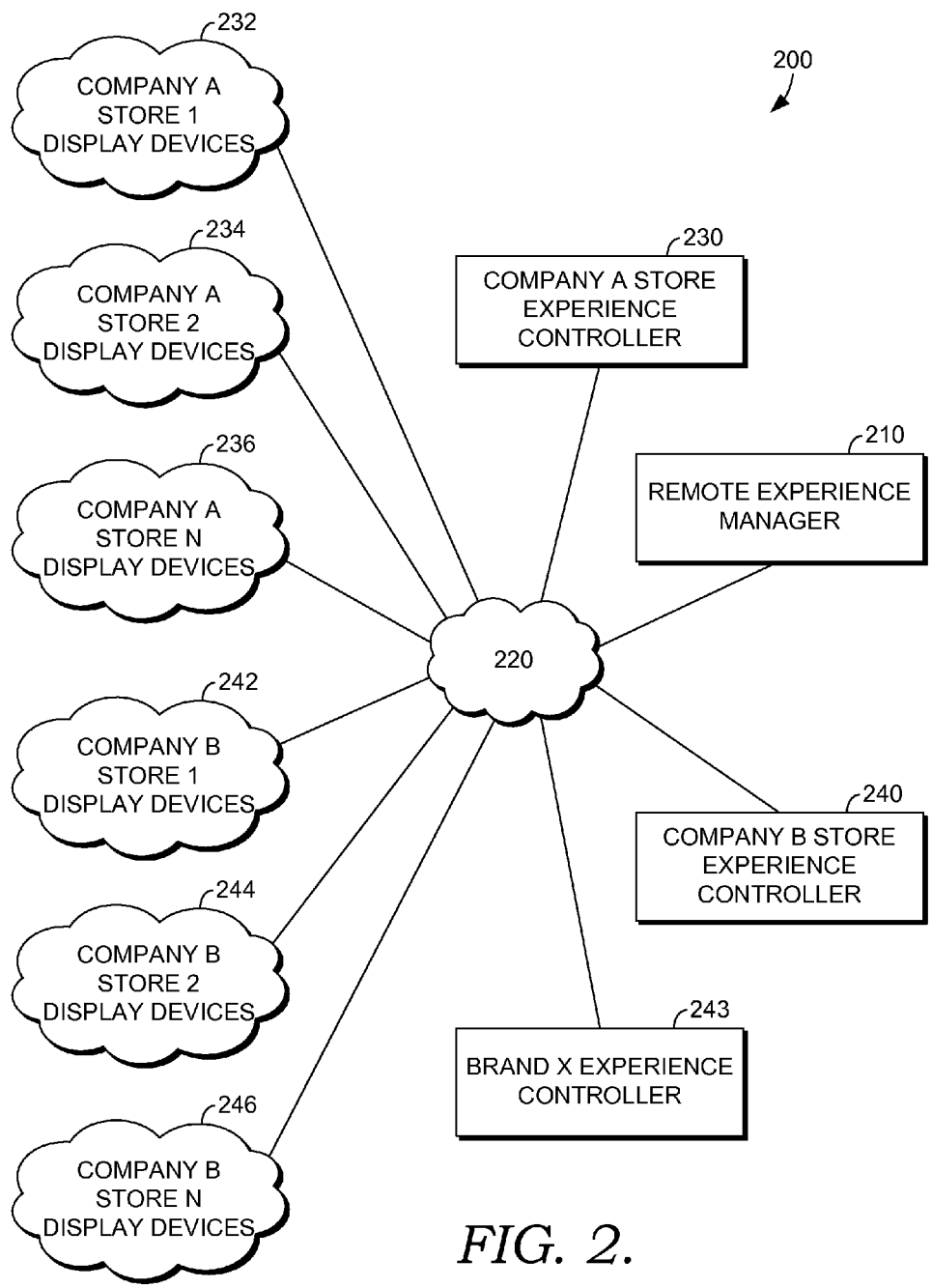
FIG. 2 is a diagram of a computing system architecture suitable for managing a user's retail experience, in accordance with an embodiment of the present invention.

Turning now to FIG. 2, an exemplary computing system architecture 200 suitable for remotely managing a retail computing experience is provided, in accordance with an embodiment of the present invention. The computing system architecture 200 shown in FIG. 2 is an example of one suitable computing system architecture. The computing system architecture 200 comprises multiple computing devices similar to the computing device 100 described with reference to FIG. 1. The computing system architecture 200 should not be interpreted as having any dependency or requirement related to any single module/component or combination of modules/components illustrated therein.

The computing system architecture 200 includes a remote experience manager 210, Company A store-experience controller 230, Company B store-experience controller 240, and brand x experience controller 243. The remote experience manager 210, store-experience controller 230, store experience controller 240, and brand x experience controller 243 may be referred to as existing in the cloud.

FIG. 2 also includes several device collections. Device collection 232 includes devices at Company A's store 1. Device collection 234 includes devices at company A's store 2. Device collection 236 includes devices at company A's store N. Device collection 242 includes devices at Company B's store 1. Device collection 244 includes devices at Company B's store 2. Device collection 246 includes devices at Company B's store N. Devices within an individual device collection are communicatively coupled to the remote experience manager 210 through network 220. Network 220 may be the Internet or some other wide area, local area, or other type of network.

Each device collection may include several different types of devices, including laptops, desktop computers, smart phones, tablets, all-in-ones, refrigerators, stoves, stereos, DVD players, game consoles, navigation equipment, and other electronics. Each of these electronic devices may be similar to, or include a component that is similar to, computing device 100 described with reference to FIG. 1. In one embodiment, the devices are connected to a store's network, which is in turn connected through the Internet to the remote experience manager 210. Each of the devices within the stores includes a communication interface that allows it to communicate with the remote experience manager 210.

The remote experience manager 210 manages a use experience on the display devices set up in a retail environment. Though only one remote experience manager is shown, embodiments could include multiple remote experience managers. For example, remote experience managers could be given control over only devices in one company's retail stores, or be brand specific. As will become apparent, even when only one remote experience manager is included in an embodiment, separate experiences may be created for different stores and brands. Further, access to user experiences and information may be restricted as appropriate. One aspect of managing the software is initially loading applications on a device when the device is initially set up in the retail store. This process will be described in more detail subsequently. A second aspect of managing the retail experience is updating software once a device is initially set up. A third aspect is collecting information from the demonstration devices.

The Company A store-experience controller 230 allows Company A to control their customers' retail experience. The Company A store-experience controller 230 is communicatively coupled to the remote experience manager 210. The Company A store-experience controller 230 can specify applications to be installed on devices within Company A's stores. Further, through the Company A store-experience controller 230, a company may specify the types of applications that should be installed on different types of devices. The Company A store-experience controller 230 can also provide usage information to Company A based on data retrieved through the remote experience manager 210. For example, a company may be able to determine how often a user opens a particular application on various devices or just how often a user interacts with a particular device or particular type of device. This information can be used to optimize the consumer's experience in the retail store. For example, Company A may want to find a better way to highlight a device capability when it learns that the application the retailer installed to highlight this capability is accessed infrequently.

The Company B store-experience controller 240 is similar to the Company A store-experience controller 230. The Company B store-experience controller 240 is included to emphasize that each company may have its own controller to customize the retail experience provided in its own stores. Both the Company A and Company B store-experience controllers 230 and 240 provide a user interface through which representatives may customize the experience.

The brand x experience controller 243 provides an interface through which a brand representative may customize the experience consumers have when interacting with devices associated with brand x. As used throughout, a brand may represent any entity in a distribution chain. For example, brand x may be a manufacturer of hardware, a software provider, a distributor, or any third party that promotes devices or applications available in a retail environment. In general, brand x has an interest in improving the retail experience. The brand x experience controller 243 provides an interface through which applications can be selected for installation on demo devices. The brand x experience controller 243 may interact with devices in stores operated by multiple companies. The interplay between the brand x experience controller 243 and the Company B store-experience controller 240 or Company A store-experience controller 230 may be managed by permissions established within the remote experience manager 210. For example, a company may wish to give complete control over the retail experience to a brand. Another company may wish to maintain control of the retail experience themselves while giving the brand limited ability to change the customers' retail experience. For example, the brand x experience controller 243 may be limited to updating versions of a particular approved application. In another store, the brand may be able to manage the entire experience on brand x devices within the store. The brands and stores may work together to co-brand a user-experience. In one aspect, the brand experience controller allows brand managers to suggest changes to a retailer that can be accepted or rejected by the retailer. These suggestions may be presented in an interface provided by a store-experience controller.

Turning now to FIG. 3, a list of devices within a device group within a particular store is shown, in accordance with an embodiment of the present invention. The devices shown give a few examples of the types of devices and variety of brands that can be controlled by the remote experience manager. Embodiments of the present invention are not limited to the devices shown, and the list is simplified somewhat for the sake of illustration. In an actual embodiment, a particular store could have hundreds of devices connected to a remote experience manager.

The device list 300 includes device 310, device 312, device 314, device 316, device 318, device 320, device 322, device 324, device 326, device 328, device 330, device 332, device 334, device 336, device 338, device 340, and device 342. Devices 310-322 are all PCs. As can be seen, they have various operating systems and various hardware configurations. In addition, PCs are associated with different brands. The remote experience manager may allow the consumers' retail experience to be customized for each device. For example, certain demo applications may only run on certain operating systems. The remote experience manager would identify a device's profile and provide applications that run on the device's operating system.

As can be seen, the devices have different hardware configurations. A remote experience manager will select versions of applications that have the ability to highlight these different capabilities during the retail experience. For example, a device with a more robust graphics accelerator and better display may receive an application that can take advantage of these characteristics in a way that visibly differentiates its performance in the retail environment from a device with less advanced capabilities. Similarly, a device with inferior capabilities would only be sent an application that it can actually run. In one embodiment, the brand management components may be able to update the retail experience for brand x PCs 310-316 while a separate brand manager component can update the user experience on brand Y PCs 318-322.

Devices 324, 326, and 328 are mobile devices that again are manufactured by different brands, have different hardware configurations, and different operating systems. The remote experience manager may provide customized experiences for each device.

Device 330 and device 332 are tablets. Each tablet has its own hardware configuration and operating system and may receive a customized experience. It should be noted, that the customized experience does not need to be so granular as to account for very small differences in devices. For example, a store may wish to include an application that runs on all devices with a similar screen size or form factor. Other applications may be specified with a higher level of granularity. Device 334 and device 336 are navigation devices. Device 338 is an all-in-one computing system. Device 340 is a game console. Device 342 is a TV.

Figure 4:
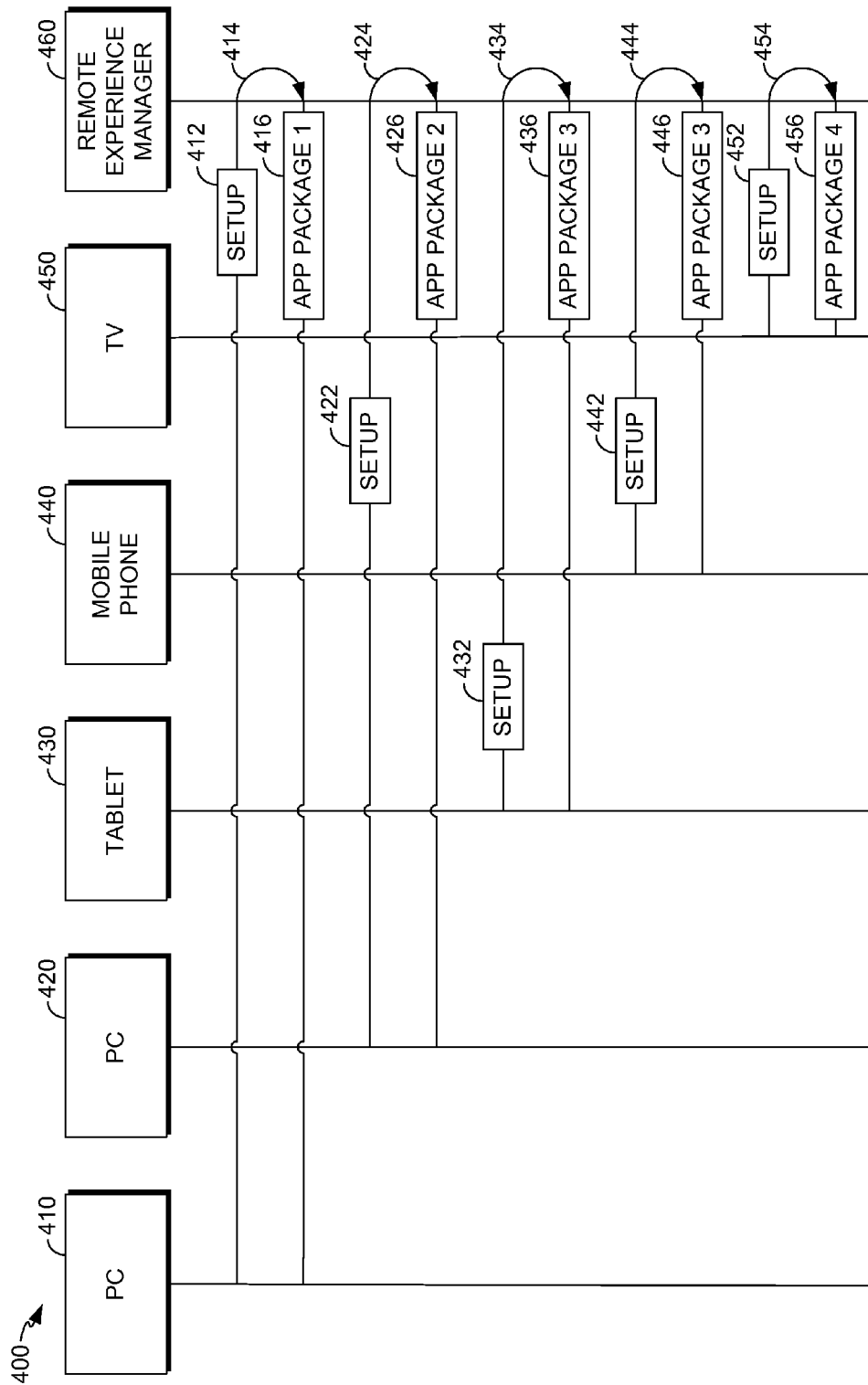
FIG. 4 is a diagram showing communications that occur between a remote experience manager and devices during device set up, in accordance with an embodiment of the present invention.

Turning now to FIG. 4, communications between various devices and a remote experience manager are shown, in accordance with an embodiment of the present invention. The computing environment 400 includes a PC 410, a PC 420, a tablet 430, a mobile phone 440, a TV 450, and a remote experience manager 460. The remote experience manager 460 may be similar to the remote experience manager 210 describe previously with reference to FIG. 2. The other devices may be associated with a single store, a single company, or be located in different stores operated by different companies. Similarly, the various devices may be associated with one or more brands.

Figure 6:
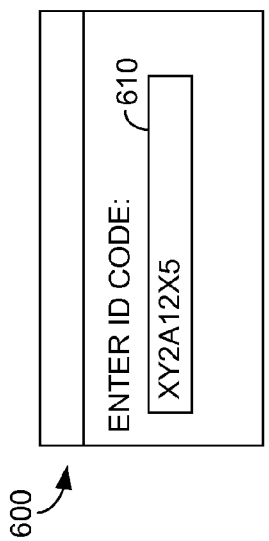
FIG. 6 is a diagram showing a setup interface, in accordance with an embodiment of the present invention.

The first set of communications illustrate, in part, what may occur when a device is initially provisioned within a retail environment. Initially, a person may physically set up the PC 410 and connect it to a network through which the PC 410 may communicate with the remote experience manager 460. The person may be provided an interface on the PC 410 through which credentials are provided and a user identification, store identification, or other information is requested. An exemplary setup interface 600 is shown with reference to FIG. 6. As can be seen, the setup interface 600 includes a single box in which an ID code may be entered. The ID code box 610 receives an ID. In one embodiment, the setup interface only includes a single box for the ID. The ID would be unique to the particular store and can serve as both an authentication feature and an identification function. The setup application could then send device information along with the ID code to a remote experience manager.

Returning now to FIG. 4, a setup message 412 is sent from the PC 410 to the remote experience manager 460. The setup message 412 may include authentication information, identification information, device characteristics, and other information. As mentioned, the authentication or identification information may identify the device with a particular store and/or brand.

The remote experience manager 460 receives the setup message 412 and processes the message at step 414. As part of processing the setup message 412, the remote experience manager associates the device with a store profile, brand profile, form profile, or other profiles. Once associated with one or more profiles, the remote experience manager will assemble an application package based on parameters established for each of these groups. Once the application package is generated, the application package 416 is communicated back to the PC 410. In one embodiment, a local store technician may accept or reject the suggested programs and/or make other changes. In another embodiment, a list of recommended application is provided and only selected applications are downloaded to create an application package. The PC then installs the application package. The application package is customized to highlight the features of the PC 410.

PC 420 communicates a setup message 422 to the remote experience manager 460. The setup message 422 is processed at step 424 and application package 426 is generated. Application package 426 is designated as application package 2 to indicate that it is different from application package 416 which was designated application package 1. This illustrates, again, that different PCs may receive different application packages based on a number of criteria. This criteria includes the store in which the PC is set up, the PC's brand, the PC's operating system, and the PC's hardware characteristics. Once generated, the application package 426 is communicated back to the PC 420. PC 420 may then install the application package automatically. In another embodiment, a local technician is given input into the installation process.

The tablet 430 communicates a setup message 432 to the remote experience manager 460. As with the PC 410, the setup message 432 may be generated after an identification code and other information is submitted in a setup interface. The remote experience manager 460 takes the setup message 432 and extracts store information, brand information, device information, and other relevant information and generates an application package 3 436 at step 434. The application package 436 is then communicated to the tablet 430.

The mobile phone 440 sends a setup message 442 to the remote experience manager 460. The remote experience manager 460 processes the setup message 442 and generates an appropriate application package 3 446. The application package 446 is generated at step 444. Note that the application package 3 is sent to both the tablet 430 and the mobile phone 440. This illustrates that different devices and even different classes of devices may receive the same application package depending upon the preferences established in the remote experience manager 460.

The TV 450 communicates a setup message 452 to the remote experience manager 460. The remote experience manager processes that setup message 452 at step 454. An application package 4 456 is generated. The application package 456 is communicated to the TV 450. The TV processes the application package 456 and installs the applications within the application package 456 to generate a user retail experience.

Figure 5:
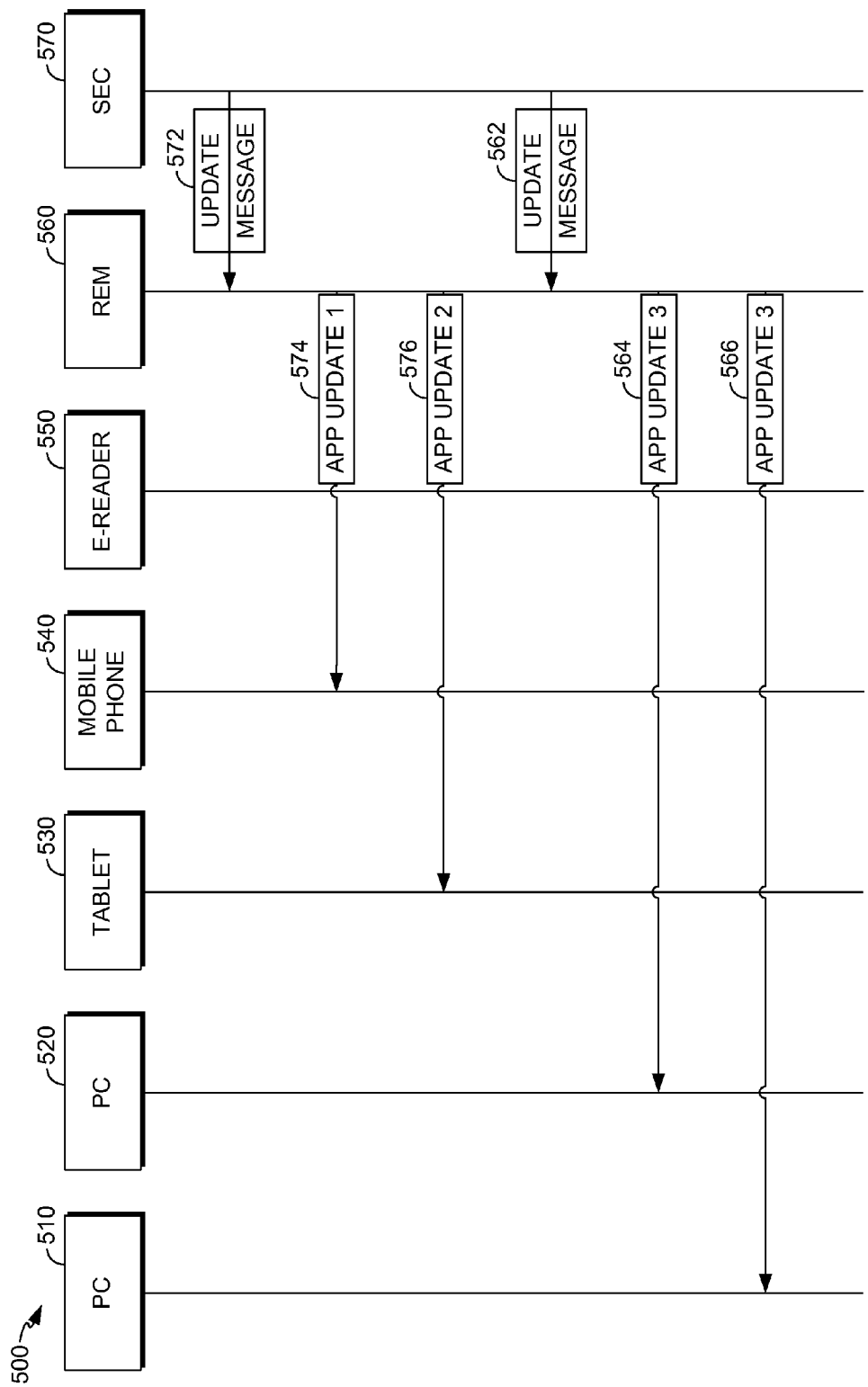
FIG. 5 is a diagram showing communications that occur between a remote experience manager and devices during an application update, in accordance with an embodiment of the present invention.

Turning now to FIG. 5, communications occurring when a retail store experience is updated is shown, in accordance with an embodiment of the present invention. The computing environment 500 in FIG. 5 includes a PC 510, a PC 520, a tablet 530, a mobile phone 540, an e-reader 550, a remote experience manager 560, and a store-experience controller 570. The store-experience controller 570 may be similar to the store-experience controller 230 or brand x experience controller 243 described previously with reference to FIG. 2. Initially, an update message 372 is sent from the store-experience controller 570 to the remote experience manager 560. The update message 572 may include updated versions of a particular application, updated settings, updated device preferences, etc. The device preferences dictate the applications and application versions installed on the device to create the user experience. For example, the update message 572 may specify that all the devices tied to either a brand or a store or brands within a store receive an updated version of a particular application.

The remote experience manager 560 receives the update message 572 and processes it to generate the updates needed to comply with the instruction in update message 572. In this case, an application update 1 574 is communicated from the remote experience manager 560 to the mobile phone 540. In addition, an application update 2 576 is communicated from the remote experience manager 560 to the tablet 530. This illustrates that update messages may cause changes to multiple devices and device types.

A second update message 562 is communicated from the store-experience controller 570 to the remote experience manager 560. The remote experience manager 560 processes the update message 562 and generates appropriate application updates. In this case, an application update 3 564 is communicated from the remote experience manager 560 to the PC 520. In addition, the remote experience manager 560 communicates the same application update to the PC 510 in application update message 566.

Figure 7:
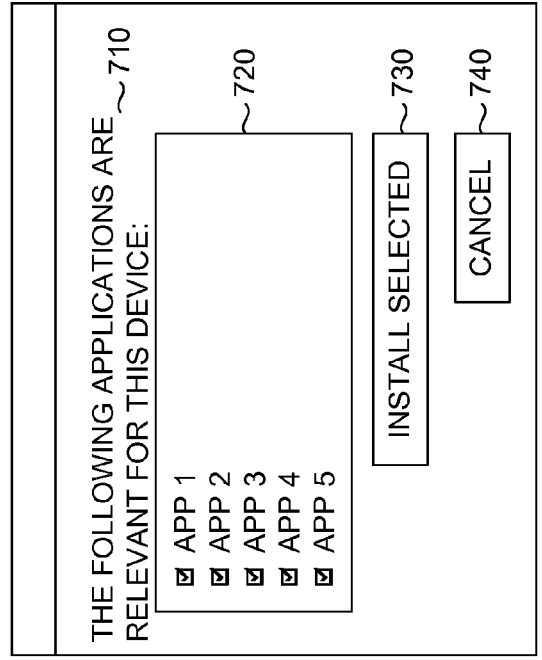
FIG. 7 is a diagram showing a setup-confirmation interface, in accordance with an embodiment of the present invention.

Turning now to FIG. 7, a setup confirmation interface 700 is shown, in accordance with an embodiment of the present invention. The setup confirmation interface 700 may be displayed on a demonstration device during setup. A local store technician may provide input through the setup confirmation interface 700. The setup confirmation interface 700 includes an instruction stating that "the following applications are relevant for this device" 710. The setup confirmation interface 700 also includes an application confirmation interface 720. The application confirmation interface 720 lists the applications that are recommended for installation and may be provided within an application package generated by the remote experience manager. In one embodiment, an individual store may add or remove applications by clicking them. In another embodiment, the list of applications is informational only and the individual person at the machine does not have the ability to modify the applications installed on a demo device. A person may complete the installation of applications by selecting the install button 730. The user could also cancel the setup by pushing the cancel button 740.

Figure 8:
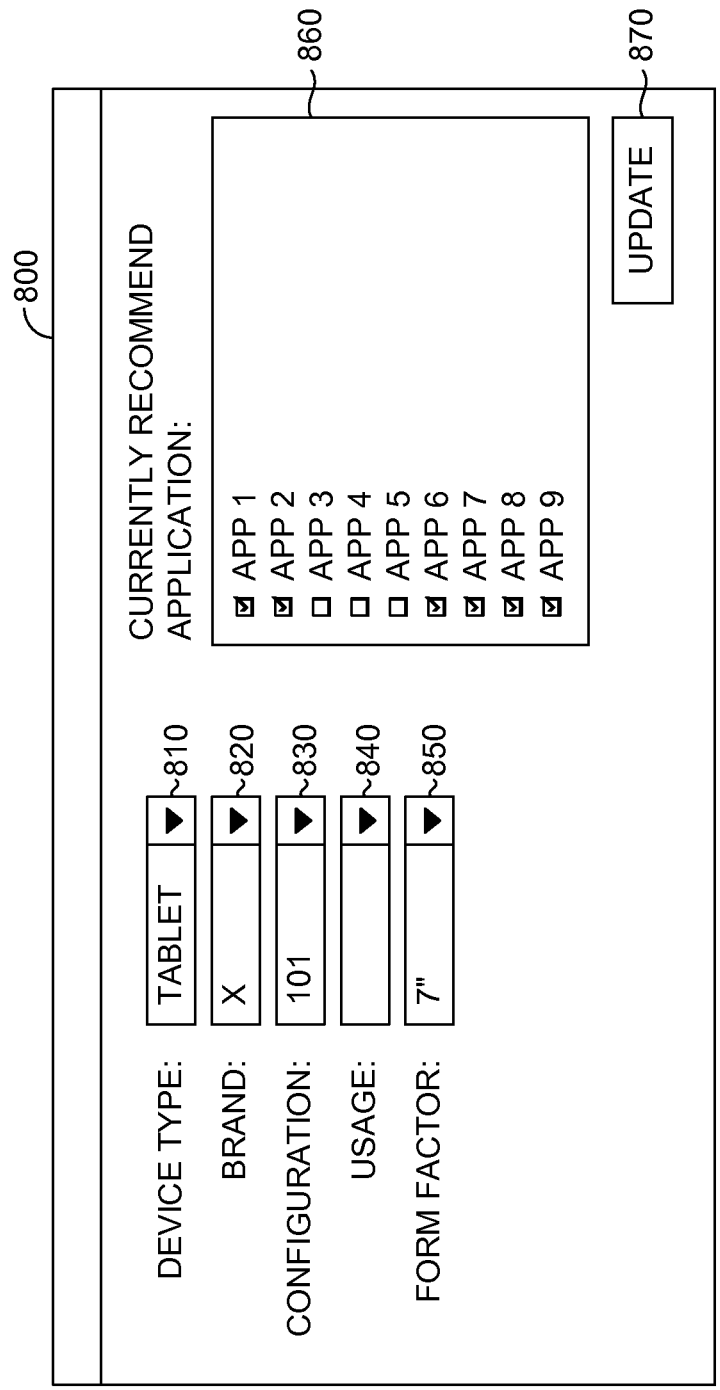
FIG. 8 is a diagram showing a device-profile interface, in accordance with an embodiment of the present invention.

Turning now to FIG. 8, a device preferences interface 800 is shown, in accordance with an embodiment of the present invention. The device preference interface 800 may be accessed through the remote experience manager or a store-experience controller. The store-experience controller may either be associated with a individual store, all of the company stores, or a brand. The device preference interface 800 receives device characteristics that form a device profile and allows a user to specify applications that should be associated with devices that match the device profile. As can be seen, the device profile may be built around several different features. For example, the device profile being built in preference interface 800 is for tablets.

In one embodiment, various types of devices supported by the remote experience manager may be selected through type interface 810. The brand interface 820 allows a user to specify a particular brand. Again, the brand interface 820 may allow a user to select one or more brands that are supported by the remote experience manager. In addition, the brands shown may be limited to brands an individual user has permission to modify. For example, within an individual store, different people may be responsible for the user experiences on different devices associated with different brands. Further, a store may wish to deputize a brand representative to run their retail experience for devices associated with that brand. The brand experience controller may be provided for this purpose, but in an alternative embodiment, a brand representative may have access to the store-experience controller.

Hardware configuration interface 830 allows a user to select a hardware configuration. The hardware configurations may be categorized by different levels or features. For example, devices with a processing speed in a first range may be selected. Similarly, devices having a combination of display characteristics and graphics processing characteristics may be categorized. The configuration may be specified in any level of granularity desired. In the example shown, configuration 101 is selected. In one embodiment, a user can click on 101 to find a fuller description of the features associated with configuration 101.

The usage interface 840 also allows an anticipated usage to be specified. For example, a device may be primarily designed for gaming, while another device may be primarily specified for productivity. Applications that highlight these intended uses may be installed on one device but not the other.

The form factor interface 850 describes the size of the screen involved. Different applications or different application versions may be appropriate depending on the screen size. The form factor interface 850 may allow a user to specify a form factor in a variety of ranges.

The application interface 860 allows different applications and application versions to be specified for the particular profile. Though not shown, application settings may also be specified. An application setting could include various display properties (e.g., color, font), default startup views for an application, and hardware settings such as volume. Thus, in the example shown, the profile would be for tablets of brand x with configuration 101 that have a form factor of seven inches. Note that in this case, usage was not specified. This illustrates that the profiles can be broad or narrow. For example, a profile could apply to all tablets without reference to brand, configuration, usage, or form factor. In addition, other categories could be included that are not shown in FIG. 8 such as processor type. In any case, once the profile parameters are established and the applications are selected, the remote experience manager will push these applications and application updates to devices that fit in the profile. Once the user is satisfied with the profile, they may push the update button 870.

The interplay between various profiles may need to be managed within a remote experience manager. For example, within a particular store or brand, numerous profiles may exist. At times, one or more profiles may match a single device. For example, there may be a rather broad profile that encompasses all tablets for the store. A second profile may be limited to tablets of brand x having a form factor that is specified. The remote experience manager may manage conflicts between overlapping profiles in various ways. In one embodiment, the more specific profile governs. In another embodiment, the profiles are reconciled by uploading all applications specified in the various applicable profiles. Access to profiles may be managed to provide access or different levels of access to designated parties. For example, a first brand may not have access to a second brand's user experience profiles. Similarly, different stores may not have access to each other's profiles. In some cases, only read access may be given. In one embodiment, profiles are maintained apart from a remote experience manager, for example on the brand controller or store-experience controller.

Where different versions of a particular application exist, a rule may be executed to determine which version of the application to provide. In one embodiment, the least capable version of the application is provided. In another embodiment, profiles submitted by a store manager take precedence over profiles submitted by a brand manager. Conflicts between profiles may be identified and an error message generated to parties responsible for managing the retail experience. In one embodiment, the generation of an error message does not prevent the applications from being uploaded to an individual device.

Figure 9:
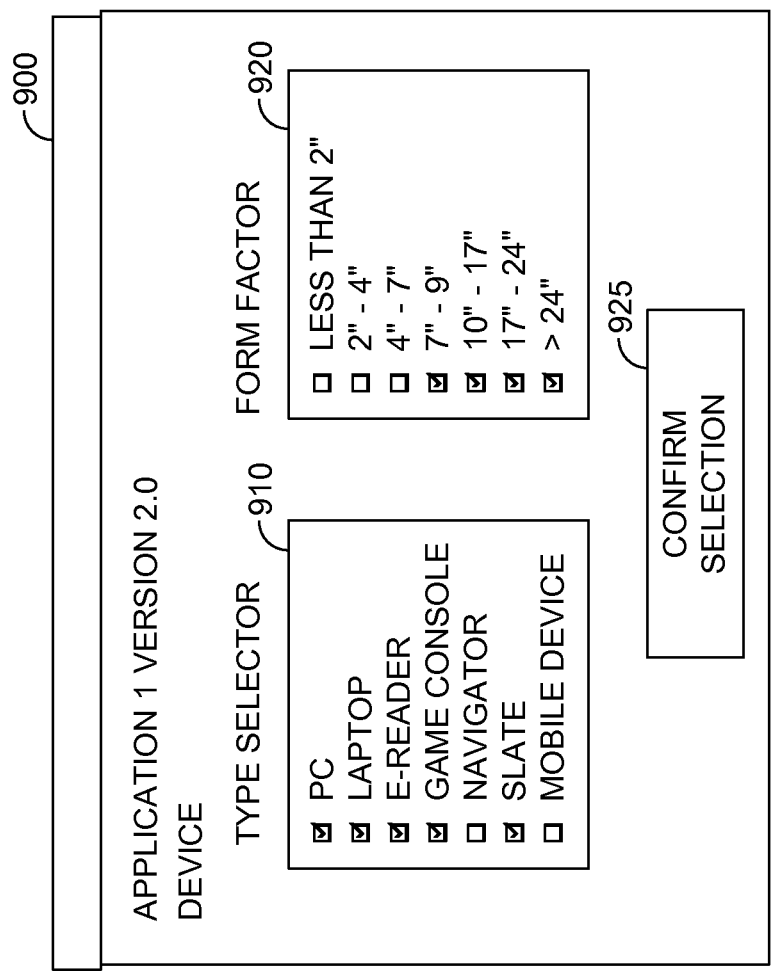
FIG. 9 is a diagram showing a application-profile interface, in accordance with an embodiment of the present invention.

Turning now to FIG. 9, an application-based experience manager interface 900 is shown, in accordance with an embodiment of the present invention. In contrast to FIG. 8 which showed an experience manager that was based on a device profile, the application-based experience manager interface 900 is based on a particular application and version. As can be seen, the interface 900 specifies the device type and form factor on which application 1 version 2.0 should be installed. The type selector 910 allows a user to specify a type of device on which application 1 should be installed. As can be seen, a PC, laptop, e-reader, game console, and slate have been selected. The form factor interface 920 allows an appropriate form factor to be selected. As can be seen, the form factors fall into ranges. Four ranges are shown as selected. In this example, application 1 version 2.0 would be installed on all of the selected devices that have a form factor above seven inches. The application profile may be confirmed by selecting confirmation button 925.

Turning now to FIG. 10, a method 1000 of remotely managing applications that provide a retail experience on a demonstration device is shown, in accordance with embodiments of the present invention. The demonstration device is located within a retail environment, such as a store where the device may be purchased. Demonstration devices include a personal computer, a slate, an e-reader, a Smartphone, a television, and a refrigerator. As mentioned previously, in order to work with embodiments of the present invention, the devices have a communication interface that allows the device to communicate with other computing devices. The retail experience includes a collection of applications and settings on the device that a user is allowed to demo or "test drive" while shopping for a device. Settings can include volume, display properties (e.g., color quality, screen resolution, refresh rate, color correction), access rights, and other device and application settings.

At step 1010, identification information that corresponds to a retail store is received. The identification information is received at a remote experience manager. The identification information is sent from a demonstration device. As described previously, the remote experience manager manages the applications and settings on a demo device remotely to provide an optimized retail experience. The identification information may be a single code that is associated with a particular chain of stores or individual store. In another embodiment, the identification information may be associated with a particular brand. As used throughout, a retail store is any environment in which a consumer may interact with a demonstration device. The identification information is used to bind the demonstration device with the retailer through a retailer ID. This allows the demonstration device to be associated with the retailer within a remote experience manager.

At step 1020, device information that describes the demonstration device characteristics is received. Again, the device information is received by the remote experience manager. The device information may describe the brand of the device, the type of the device, the form factor, a class of processor, an operating system, and other hardware and software characteristics of the demonstration device.

At step 1030, a relevant group of applications for installation on devices that conform with the device information are generated. The relevant group of applications are drawn from applications that are used to generate consumer experience on demonstration devices. As described previously, not every application available may be suitable for a particular demonstration device. For example, applications that highlight features of a Smartphone may not be applicable or useful to demonstrate features of a personal computer. Similarly, even within the same type of device, some applications may highlight hardware or software functionality available on a particular device and is useful on other devices of the same type that have different hardware and software characteristics. In other words, the group of applications are selected to optimize the retail experience and highlight features of the demonstration device.

The group of applications may be generated by matching the device information with a user-experience profile. As described previously, a user-experience profile may specify device characteristics. The user-experience profile also specifies applications that should be installed on devices that satisfy those characteristics. In some instances, the information may not exactly match any available device profiles. In this case, the remote experience manager may determine the closest applicable user-experience profile and supply the applications that are associated with that profile.

In one embodiment, the remote experience manager evaluates a hierarchical order of user-profile experiences. At the top level, a general user-experience profile that only specifies a device type or other high-level information is provided. A series of the high-level user-experience profiles may be stored for each type of device supported. In this case, every device that attempts to communicate with the remote experience manager will find at least one high-level profile that matches. Under each device type, more specific user-experience profiles may be stored. The device profiles may be stored in a hierarchical order. When receiving device information, the remote experience manager attempts to find the most specific profile available that is a match, which would be the user-experience profile furthest from the root node. The remote experience manager traverses the profile tree until a user-experience profile is found that matches all of the device characteristics.

At step 1040, one or more applications are communicated from the relevant group of applications to the demonstration device. As mentioned, one or more applications may be based on matching the device information with a user-experience profile.

In an alternative embodiment, prior to communicating the one or more applications to a demonstration device, a list of available or recommended applications is submitted to the demonstration device. The list may then be displayed on an interface through which a person, for example a store employee, may select one or more applications from the device. Upon receiving the selection, the remote experience manager communicates those applications to the demonstration device.

Turning now to FIG. 11, a method 1100 of remotely managing a consumer experience in a retail store is provided, in accordance with an embodiment of the present invention. At step 1110, a plurality of devices are bound to a retailer. In one embodiment, individual devices within the plurality of devices are bound to the retailer when an ID key is received from the individual device. The ID is associated with the retailer, though an individual retailer may use multiple IDs. Once bound to the retailer, through the key, the devices are remotely managed to provide a consistent retail experience on demonstration devices located across multiple stores.

At step 1120, a user-experience profile that specifies one or more device characteristics and a group of applications to be installed on devices that have the one or more device characteristics is received. The user-experience profile may be received by a remote experience manager that is communicatively coupled to the plurality devices. The user-experience profile may be generated by a store-experience controller or a brand experience controller or other component that allows a user-experience profile to be generated or modified. As described previously, a remote experience manager may receive multiple user-experience profiles with different applications specified for different hardware profiles.

At step 1130, the group of applications is communicated to each device within the plurality of devices that conforms to the user-experience profile. These applications may be communicated as part of an initial setup of the demonstration devices or as an update. In addition to installing new applications, instructions that specify particular settings and optimum values for the settings may be specified. For example, a setting may be volume and the optimum value for the volume setting is 20% or some other measure. In another example, the setting is a display theme and the value is "modern." The group of applications may also comprise an update for the devices after they have been initially set up. In a further embodiment, instructions to remove previously installed applications may be provided. Further, an instruction to reset settings to the optimum values may be submitted to the devices one or more times and at irregular or regular intervals. In addition to communicating applications and settings to the demonstration devices, a remote experience manager may receive usage data describing user interactions with the applications and the demonstration device in general. In an embodiment, the reset instruction may also be submitted locally on the demonstration device In one embodiment, access codes that allow a group of applications to be installed on the demonstration device without need to pay for the group of applications is provided. In another embodiment, access codes for network based applications are provided to the demonstration devices. In addition to providing applications and settings, instructions that enable the demonstration device to install the applications without user intervention may be provided. Further, additional instructions may be provided so that once installed, the applications are in a retail mode that allow them to be accessed without any further configuration by the consumers or retailers. For example in one embodiment, consumers or retailers don't need to provide any additional information or perform any task to use the applications through one of the demonstration devices.

Examples applications include games and productivity software as well as demonstration software that may provide product comparison information. In another embodiment, an application blocks access to competitors' websites or websites that are inappropriate for children. In one embodiment, applications on the demonstration device are given access to sample e-mails, buddy lists, and/or sample documents that may be accessed over a network and demonstrate the functionality of applications. Other files, such as video, or music files may be provided to demonstrate application features, such as synchronization functions. These files may be communicated to the demonstration device, or access could be granted to these files from a network location at which they may be accessed.

Figure 12:
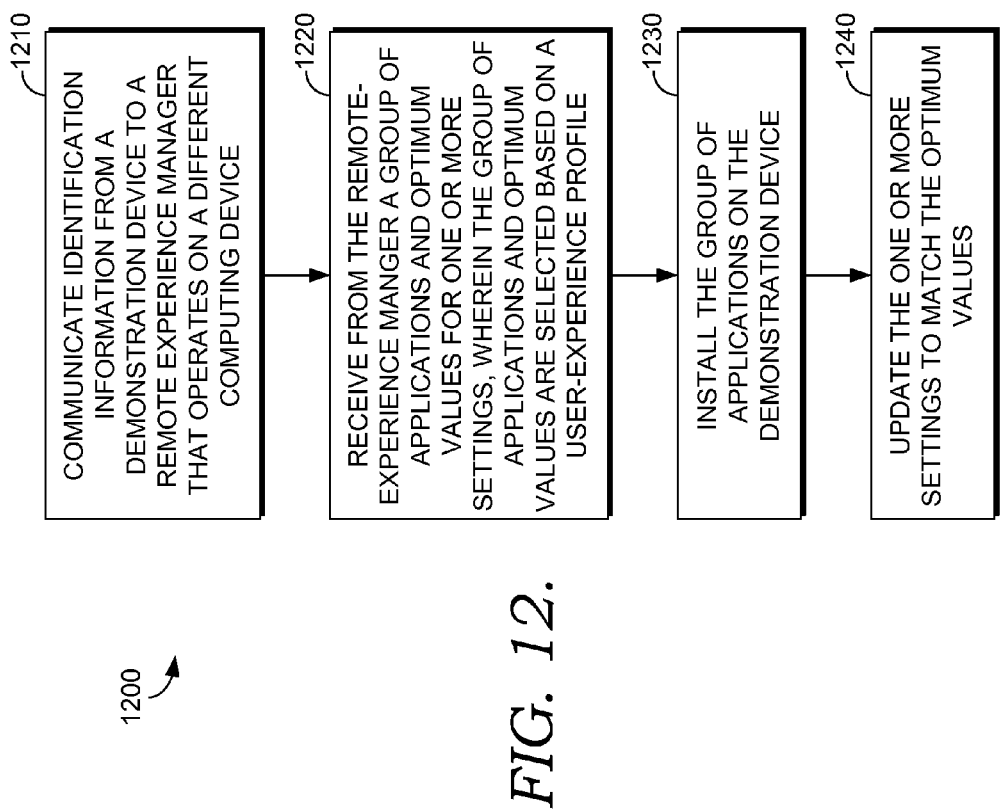
FIG. 12 is a flow diagram illustrating a method of remotely managing applications on a consumer device that enhance a consumer's retail experience, in accordance with an embodiment of the present invention.

Turning now to FIG. 12, a method 1200 of remotely managing content on a demonstration device within a retail setting is provided, in accordance with an embodiment of the present invention. At step 1210, identification information is communicated from a demonstration device to a remote experience manager that operates on a different computing device. The demonstration device is available for consumer interaction within a retail store. Identification information may identify the computing device with a brand and/or the retail store. The remote experience manager may then bind the demonstration device to a retailer that is using the identification information provided. For example, all demonstration devices within stores that are run by a particular retailer may be bound to the retailer and managed together. A group of devices within the retail stores that are provided by a particular brand may form a different group. As can be seen, these groups may overlap.

At step 1220, a group of applications and optimum values for one or more settings are received from the remote experience manager. The group of applications and optimum values are selected based on a user-experience profile. As described previously, the user-experience profile may be matched with device characteristics for the demonstration device. The user device characteristics may have been provided previously along with the identification information. In another embodiment, the remote experience manager queries the demonstration device and retrieves the relevant information based on that analysis.

At step 1230, the group of applications is installed on a demonstration device. As mentioned previously, this installation may occur without the retailer or consumer needing to pull out any additional information to install the applications. Further, the applications may be configured to a retail experience that allows them to run immediately without additional information being provided. Example files may also be provided for the applications to interact with.

At step 1240, the one or more settings are updated to match the optimum values. In a further embodiment, the demonstration device to is instructed to update the one or more settings or reset the one or more settings to match the optimum values. Upon receiving the instruction, the demonstration device automatically updates the one or more settings to match the optimum values. The instruction may be received through an interface provided on the demonstration device or remotely.

Embodiments of the invention have been described to be illustrative rather than restrictive. It will be understood that certain features and subcombinations are of utility and may be employed without reference to other features and subcombinations. This is contemplated by and is within the scope of the claims.

The invention claimed is:

1. A method of remotely managing a consumer experience in a retail store, the method comprising:
    binding a plurality of demonstration devices to a retailer corresponding to a chain of retail stores, wherein the plurality of demonstration devices are located in a plurality of non-virtual retail stores belonging to the chain of retail stores;
    receiving demonstration device information that describes device hardware and software characteristics for each device in a plurality of demonstration devices;
    receiving a user-experience profile that specifies at least one device characteristic and a group of applications to be installed on each device in the plurality of demonstration devices that has the at least one device characteristic, wherein the group of applications to be installed is selected based on matching the at least one device characteristic specified by the user-experience profile with the demonstration device information and provides a consistent consumer experience across the plurality of non-virtual retail stores belonging to the chain of retail stores with regard to each device that has the at least one device characteristic; and
    communicating the group of applications to each device within the plurality of demonstration devices that conforms to the user-experience profile to provide a consistent consumer experience on each device within the plurality of demonstration devices located in the plurality of non-virtual stores.

2. The method of claim 1, wherein the method further comprises receiving additional user-experience profiles for different types of demonstration devices within the plurality of devices located in the plurality of non-virtual stores.

3. The method of claim 1, wherein the group of applications is communicated with activation codes that allow the group of applications to be installed on a demonstration device within the plurality of devices located in the plurality of non-virtual stores without a need to pay for the group of applications.

4. The method of claim 1, wherein the method further comprises communicating a group of access codes for network based applications, wherein the group of access codes allows consumers to use the network based applications without paying.

5. The method of claim 1, wherein the method further comprises communicating a reset message to a demonstration device that instructs the demonstration device within the plurality of demonstration devices located in the plurality of non-virtual stores to reset one or more settings to an optimum value.

6. The method of claim 1, wherein the method further comprises receiving an update for an application within the group of applications, and, without human intervention, communicating the update to a demonstration device within the plurality of devices located in the plurality of non-virtual stores.

7. The method of claim 1, wherein the group of applications comprise one or more of applications that pull demonstration content from a network, applications that deliver core functionality of a demonstration device, and applications that provide specific demonstration functions.

8. The method of claim 1, wherein the method further comprises receiving a modification to the user-experience profile from the retailer.

9. A system for providing a retail experience on a demonstration device, the system comprising:
a processor; and
a remote experience manager located at an experience management device, the remote experience manager configured to:
receive identification information from a demonstration device that specifies that the demonstration device is associated with a chain of retail stores;
bind a retail store identification to the demonstration device, the retail store identification corresponding to the chain of retail stores, wherein the demonstration device is one of a plurality of demonstration devices located within a non-virtual retail store belonging to the chain of retail stores;
receive demonstration device information that describes device hardware and software characteristics for the demonstration device and identification information that identifies a retail store bound to the demonstration device;
generate, a group of applications for installation on the demonstration device based on a user-experience profile determined by matching the demonstration device information received with the user-experience profile, wherein the group of applications generated highlights the hardware and software characteristics of the demonstration device based on the demonstration device information, and optimizes the consumer experience in the non-virtual retail store by producing a consistent consumer experience across the chain of retail stores based on the retail store information, and wherein the user-experience profile specifies the group of applications for installation to satisfy the hardware and software characteristics of the demonstration device; and
communicate the group of applications to the demonstration device located within the non-virtual retail store.

10. The system of claim 9, wherein the demonstration device information comprises a hardware configuration for the demonstration device.

11. The system of claim 9, wherein the remote experience manager is further configured to communicate a list of the relevant group of applications to the demonstration device and receive a selection of one or more applications from the demonstration device.

12. The system of claim 9, wherein the remote experience manager is further configured to:
receive a request from a store-experience controller that specifies a specific additional application, to install on the demonstration device, and
communicate the specific additional application to the demonstration device such that the store-experience controls enables a retailer of the chain of retail stores to remotely control the consumer experience in the non-virtual retail store.

13. The system of claim 9, wherein remote experience manager is further configured to:
receive a request from a brand-experience controller associated with a brand, which specifies a consumer experience for the brand's demonstration devices located within the non-virtual retail store;
install an additional application on each of the plurality of demonstration devices conforming to a designated profile;
determine that the demonstration device conforms to the designated profile; and
communicate the additional application to the demonstration device.

14. The system of claim 9, wherein the remote experience manager is further configured to communicate an instruction to the demonstration device to automatically reset a state of each of one or more applications to designated settings.

15. The system of claim 9, wherein the remote experience manager is further configured to:
receive a request from a brand-experience controller associated with a brand, wherein the request specifies a consumer's retail experience for the brand's demonstration devices located within the non-virtual retail store;
install an additional application on the brand's devices conforming to a designated profile;
determine that the demonstration device is the brand's device and conforms to the designated profile; and
communicate the additional application to the demonstration device.

16. One or more computer-readable storage memories having computer-executable instructions embodied thereon, that when executed by a computing device perform a method of remotely managing content on a demonstration device within a retail setting, the method comprising:
communicating identification information from the demonstration device to a remote experience manager that operates on a separate computing device, wherein the demonstration device is available for consumer interaction within a non-virtual retail store belonging to a chain of retail stores, and wherein the identification information specifies that the demonstration device is associated with the chain of retail stores;
receiving from the remote experience manager a group of applications and optimum values for one or more settings of the demonstration device, wherein the group of applications and the optimum values are selected based on matching a user-experience profile with the identification information that specifies the chain of retail stores with which the demonstration device is associated, such that a consistent consumer experience is produced across the chain of retail stores with respect to the demonstration device;
installing the group of applications on the demonstration device within the non-virtual retail store belonging to the chain of retail stores; and updating the one or more settings of the demonstration device within the non-virtual retail store to match the optimum values received from the remote experience manager.

17. The memories of claim 16, wherein the method further comprises receiving one or more access codes that enable the demonstration device to access applications that run over a network.

18. The memories of claim 16, wherein the method further comprises receiving, at the demonstration device, a new application to install, wherein the new application was added to the user-experience profile.

19. The memories of claim 16, wherein the method further comprises receiving an instruction to reset the one or more settings to the optimum values.

20. The memories of claim 16, wherein the method further comprises communicating consumer interaction information to the remote experience manager.

\* \* \* \* \*